B. H. SEEVERS.
VEHICLE WHEEL.
APPLICATION FILED AUG. 2, 1912.

1,051,457.

Patented Jan. 28, 1913.

Witnesses:
A. L. McClintock
Clyde Hoffman

Inventor
Bert H. Seevers,
by C. E. Humphrey,
Atty.

UNITED STATES PATENT OFFICE.

BERT HALASTER SEEVERS, OF AKRON, OHIO.

VEHICLE-WHEEL.

1,051,457.

Specification of Letters Patent. Patented Jan. 28, 1913.

Application filed August 2, 1912. Serial No. 712,987.

*To all whom it may concern:*

Be it known that I, BERT HALASTER SEEVERS, a citizen of the United States, residing at Akron, in the county of Summit and State of Ohio, have invented new and useful Improvements in Vehicle-Wheels, of which the following is a specification.

This invention relates to improvements in vehicle wheels and relates more especially to the construction of the rim portion thereof.

The object of the invention is to provide a wheel of such construction that it will effectually cushion the vehicle in connection with which the wheel is used and in which the wear on the same is reduced to a minimum, thereby greatly prolonging the life of the wheel.

The invention specifically contemplates the provision of a series of overlapping tread-forming members sustained by a pair of inner continuous circumferential members, the construction being such that the outer lapping members are afforded a cushioning effect due to their frictional engagement with said inner members during the inward movement of the former under a load. The outer cushioning and overlapping members are provided with a band of rubber to deaden the noise incident to the use of the wheel and to further enhance the cushioning qualities of the device.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the claim hereunto appended.

Figure 1:
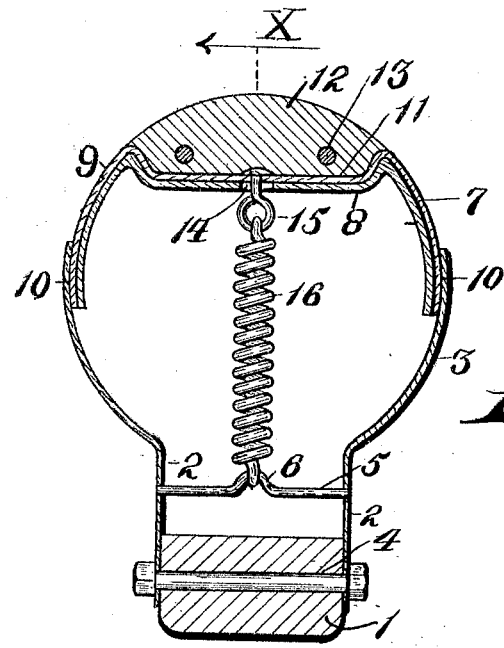
Figure 2:
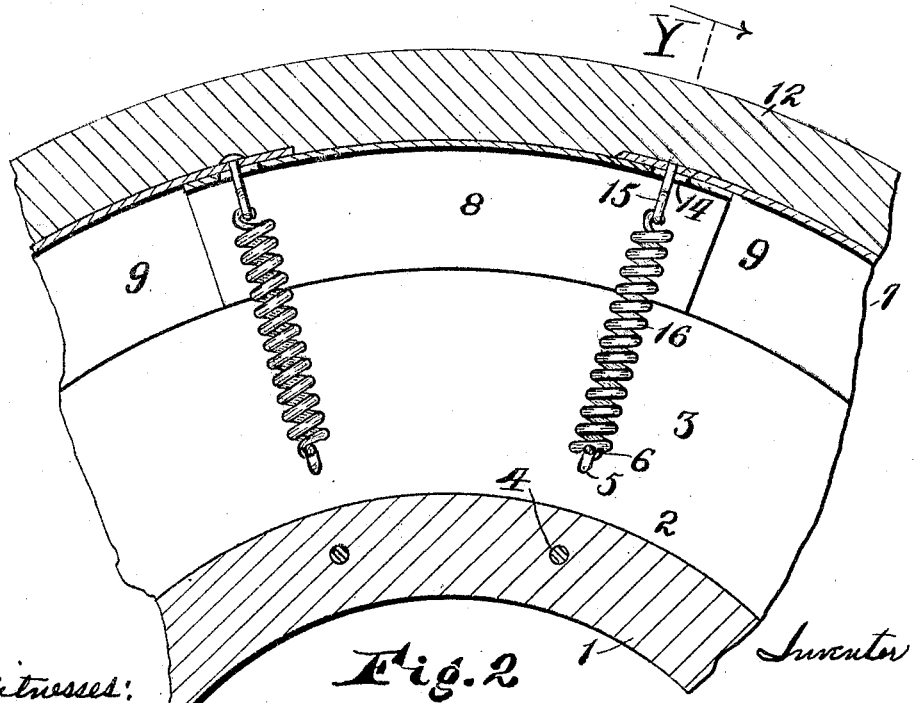

In the drawings in which similar reference numerals indicate like parts in the different figures, Figure 1, is a transverse sectional view of the rim portion of a vehicle wheel in section on line Y of Fig. 2; and, Fig. 2, is a longitudinal sectional view of a tire portion of a vehicle wheel on line X of Fig. 1.

Referring to the drawings in detail, the reference numeral 1 denotes the felly of a vehicle wheel which may be of ordinary construction. Secured to the two side faces of the felly 1 are a pair of outwardly-projecting and circumferentially-extending endless ring-forming members 2. These members extend outwardly in parallel relation a short distance and are then provided with widely-diverging portions 3 preferably formed in arcs of circles in cross section and extending beyond the transverse line of the axis of the arcs described by these portions. Extending at intervals between the members 2 and through the felly 1 are bolts 4 by which the members 2 are held in position. Also extending between suitable parts of the members 2 are cross-pins 5, arranged in a circumferential series and spaced from each other, and each preferably provided at its median portion with an out-turned portion 6 for a purpose to be later described.

Mounted between the portions 3 of the members 2 are a series of short segment members 7 all constructed approximately similarly and with the ends of contiguous members overlapping as shown in Fig. 2. The arrangement of these members is as shown in Fig. 2 wherein both ends of the members 8 are overlapped by the contiguous members 9. The lateral walls of the members 7, 8 and 9 are preferably in arcs of circles concentric with the axis of the arcs described by the portions 3 so as to form at the points 10 where the members 7, 8 and 9 engage the portion 3 longitudinally-extending frictional joints.

The outer portions of the members 7, 8 and 9 are inwardly-bent to form a continuous circumferential groove 11 in which is mounted a tire 12 of elastic material, such, for instance, as vulcanized india rubber and this is held in position preferably through the medium of endless retaining wires 13. The rubber tire will be so fashioned on its inner face as to snugly fit in the groove 11 formed in the outer face of the members 7, 8 and 9. The inner series of members 8 are provided with longitudinal slots 14 where they lap the ends of the contiguous members 9. The lapping portions of the members 9 opposing the slots 14 are provided with inwardly-extending hooks or loops 15 which are arranged in radial alinement with the cross-pins 5. Extending between the hooks or loops 15 and the pins 5 are resilient elements, such, for instance as coiled springs 16 the function of which is to draw inwardly and securely hold in position the lapping members 7, 8 and 9 which form the outer or tread portion of the tire of the vehicle wheel. In use, under a load, the various members 7, 8 and 9 will be pressed inwardly thereby forcing the flaring portions 3 of the members 2 laterally apart and setting up considerable frictional resistance at the joints 10 to oppose the pressure of the load imposed on the wheel and after the portion of the tire which engages the ground rises therefrom the lateral inward pressure or the spring of the portions 3 tends to force them toward each other and will force outwardly the members 7, 8 and 9. The resistance to the inward movement of the members 7, 8 and 9 against the inner lateral faces of the walls 3 at the frictional joints 10 will serve to furnish a substantial cushion for the vehicle. The springs 16 are utilized to prevent the members 7, 8 and 9 from being forced radially out of their seat between the two flaring portions 3, when in use.

I claim:

A vehicle wheel embodying a felly, a pair of endless rings secured to the lateral faces thereof, the inner portions of said rings extending outwardly in parallel relation and provided with transversely-alined apertures, the outer portions of said rings flaring away from each other and fashioned in concentric arcs of a circle in cross section and extending outwardly beyond the transverse line of the axis of said arcs, a series of separated cross-bars mounted in said apertures, a series of tread-forming members formed with their lateral walls concentric with the flaring portions of said rings and positioned with their ends overlapping and with their lateral walls in lapping engagement with the inner faces of the outwardly-flaring portions of said rings, the contacting portions of said tread-forming members and said rings forming frictional joints adapted to resist inward pressure on the former, the outer faces of said tread-forming members longitudinally recessed to form when said members are assembled a continuous circumferential groove constituting a tire seat, an elastic tire mounted in said groove, anchoring members extending inwardly from the inner faces of said tread-forming members, and springs extending between said anchoring members and said cross-bars and normally tending to draw said tread-forming members inwardly for holding the latter in position.

In testimony whereof I have hereunto set my hand in presence of two subscribing witnesses.

BERT HALASTER SEEVERS.

Witnesses:
C. E. HUMPHREY,
A. L. McCLINTOCK.